(12) United States Patent
Husted

(10) Patent No.: US 8,155,140 B1
(45) Date of Patent: Apr. 10, 2012

(54) COLLISION AVOIDANCE FOR A NETWORK SYSTEM

(75) Inventor: Paul J. Husted, San Jose, CA (US)

(73) Assignee: Qualcomm Atheros, Inc., San Jose, CA (US)

( * ) Notice: Subject to any disclaimer, the term of this patent is extended or adjusted under 35 U.S.C. 154(b) by 701 days.

(21) Appl. No.: 12/323,290

(22) Filed: Nov. 25, 2008

(51) Int. Cl.
*H04L 12/413* (2006.01)

(52) U.S. Cl. .............. 370/445; 370/338; 370/441

(58) Field of Classification Search .......... 370/310, 370/338, 349, 441, 445, 447, 265.34, 345; 702/40; 710/7, 16, 33; 714/795; 375/265.34, 375/345, 265, 340, 343

See application file for complete search history.

(56) References Cited

U.S. PATENT DOCUMENTS

| | | | |
|---|---|---|---|
| 4,292,672 A * | 9/1981 | Southgate | 702/40 |
| 4,701,905 A * | 10/1987 | Un et al. | 370/441 |
| 5,465,405 A * | 11/1995 | Baseghi et al. | 455/226.4 |
| 5,657,326 A | 8/1997 | Burns et al. | |
| 6,473,414 B1 | 10/2002 | Hartley et al. | |
| 6,643,296 B1 | 11/2003 | Fukuhara | |
| 6,693,981 B1 * | 2/2004 | Yang et al. | 375/340 |
| 6,848,010 B1 * | 1/2005 | Wu et al. | 710/7 |
| 6,865,176 B2 | 3/2005 | Averbuch et al. | |
| 7,054,329 B2 | 5/2006 | Cervello et al. | |
| 7,177,294 B2 | 2/2007 | Chen et al. | |
| 7,184,413 B2 | 2/2007 | Beyer et al. | |
| 7,209,467 B2 | 4/2007 | Liu et al. | |
| 7,277,451 B1 | 10/2007 | Chen et al. | |
| 7,372,924 B1 * | 5/2008 | Oberg et al. | 375/345 |
| 7,489,708 B2 | 2/2009 | Kim | |
| 7,492,736 B2 | 2/2009 | Ho | |
| 7,586,884 B2 * | 9/2009 | Awater et al. | 370/338 |
| 2004/0170237 A1 * | 9/2004 | Chadha et al. | 375/343 |

OTHER PUBLICATIONS

U.S. Appl. No. 12/235,287, entitled "Communication System with Multi-Dimensional Rate Adaptation" by Paul Petrus; filed Sep. 22, 2008.

* cited by examiner

*Primary Examiner* — Andrew Lai

(74) *Attorney, Agent, or Firm* — Meyertons Hood Kivlin Kowert & Goetzel, P.C.

(57) ABSTRACT

Determining if a packetized wireless signal is present on a wireless communication medium. A first signal may be received from the wireless communication medium. A correlation of the first signal may be performed using a delayed version of the first signal to produce a correlation result. The delayed version may be delayed by a time period corresponding to a packet structure of a wireless communication protocol used by signals transmitted on the wireless communication medium. It may be determined if the correlation result indicates presence of a packetized wireless signal in the first signal. The packetized wireless signal may have the packet structure of the wireless communication protocol. If the correlation result does not indicate presence of the packetized wireless signal in the first signal, wireless communication may be performed over the wireless communication medium.

19 Claims, 5 Drawing Sheets

COLLISION AVOIDANCE FOR A NETWORK SYSTEM

FIELD OF THE INVENTION

The present invention relates generally to network communication, and more particularly to a collision avoidance method for a network system.

DESCRIPTION OF THE RELATED ART

Network communication is being used for a plethora of applications. In time division duplex (TDD) network systems, such as WLAN (wireless local area network) systems, if two devices attempt to transmit at the same time, they will collide. In carrier sense multiple access (CSMA) TDD systems, when the transmitter of the shorter packet completes transmission, it will sample the medium, and transmit again if it determines the medium is clear (e.g., by comparing power levels on the medium to a threshold). If this device transmits while the other device is still transmitting, a "ping pong" collision sequence can occur where each device transmits while the other is transmitting. This sequence may occur when both transmitting devices choose the same back off period of time (which is usually chosen randomly by each device) after a previous frame transmitted on the medium. In some WLAN systems, such as IEEE 802.11, these backoff periods are determined as a pseudo-random number of slot periods, with the random number being between 0 and N−1 making the probability of collision 1/N for a system with two devices wishing to transmit. Thus, a collision will happen in this sort of network with a non-zero probability, and the collisions may keep occurring until an appropriate back off is selected which allows one device to be transmitting while the other is receiving (typically requiring a much larger back off time). In a half-duplex system like WLAN, this can greatly lower overall throughput and medium efficiency until the ping pong collisions cease.

Current schemes use raw power detection for determining clear channel availability (CCA) when the preamble is missed. This scheme has some limitations, since setting the raw power threshold too low can cause false CCA detections. Therefore, improved collision avoidance strategies are desired for enabling devices to more efficiently use network bandwidth.

SUMMARY OF THE INVENTION

Various embodiments are presented of a system and method for communicating over a wireless communication medium. The communication may be between a first wireless device and a second wireless device. The wireless devices may be any of a variety of devices capable of wireless communication, e.g., routers, laptop computers, smart phones or cellular phones, personal digital assistants, etc. The first and second wireless devices may communicate using a wireless communication protocol, e.g., an 802.11x protocol, among other possibilities.

A first signal may be received from the wireless communication medium, e.g., by the first wireless device.

A correlation of the first signal may be performed with a second signal to produce a correlation result. The second signal may correspond to a wireless communication protocol used in signals on the wireless communication medium. For example, the second signal may be a delayed version of the first signal. The delayed version may be delayed by a time period corresponding to a packet structure of the wireless communication protocol used by signals transmitted on the wireless communication medium. For example, the delayed version may be delayed by a time period (e.g., 3.2 microseconds) designed to align respective packet elements present in the first signal and the delayed version of the first signal. More specifically, in one embodiment the delayed version may be delayed by a time period designed to align a cyclic prefix in a guard prefix of the first signal with a matching packet segment at the end of the symbol of the delayed signal.

Alternatively, the second signal may include a direct sequence spread spectrum (DSSS) chip pattern. The direct sequence spread spectrum chip pattern may be used to generate packetized wireless signals on the wireless communication medium. In this case, the correlation may be performed with a delayed version (similar to above, although with a different time period, e.g., 1 microsecond) or may be cross correlated with another signal, e.g., one formatted according to the spread spectrum chip pattern. Thus, the delayed version may be delayed by a time period to align a first symbol with a second symbol. In either case, the correlation result may be periodic, thereby revealing that the first signal includes a packetized wireless signal that is transmitted according to the wireless communication protocol.

It may be determined if the correlation result indicates presence of a packetized wireless signal in the first signal. For example, presence of the packetized wireless signal may be indicated by determining if the correlation result is periodic. The presence of a packetized wireless signal may indicate that the wireless communication medium is in use by the second device capable of communicating over the wireless communication medium. The packetized wireless signal may have the packet structure of the wireless communication protocol. More specifically, the packetized wireless signal may be transmitted according to an 802.11x protocol.

If the correlation result does not indicate presence of the packetized wireless signal in the first signal, wireless communication may be performed over the wireless communication medium, e.g., with the second device.

If the correlation result indicates presence of the packetized wireless signal, the above receiving the signal, performing the correlation, and determining if the correlation result indicates the presence of a packetized wireless signal may be performed one or more additional times.

Various portions of the method described above may be performed in hardware or software. In one embodiment, the method may be performed solely in hardware of the wireless device(s). For example, the hardware may include first circuitry for performing the correlation and second circuitry for performing the determination. Alternatively, the method may be performed by firmware of the wireless device (or some combination of firmware and hardware of the wireless device). In one embodiment, the wireless device may include a memory medium which comprises program instructions for performing the method. The program instructions may be executable by a processor to perform the method. Note however, that references to active communication or actions of the wireless device may not be performed explicitly by execution of the program instructions. For example, performing wireless communication may be initiated as a result of the execution of the program instructions.

BRIEF DESCRIPTION OF THE DRAWINGS

A better understanding of the present invention can be obtained when the following detailed description of the preferred embodiment is considered in conjunction with the following drawings, in which.

Figure 1:
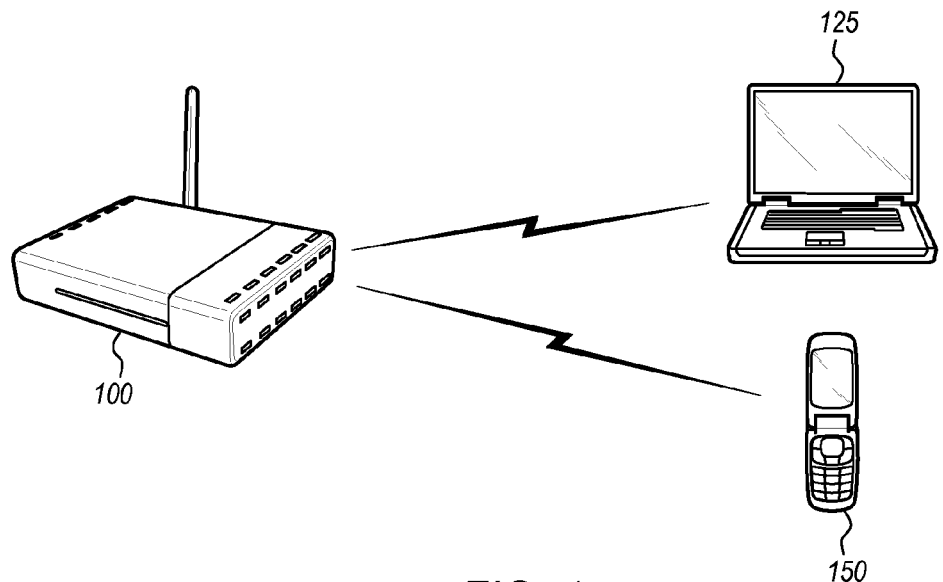
FIG. 1 illustrates an exemplary network system, according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

FIG. 1—Exemplary Wireless System

FIG. 1 illustrates an exemplary network system according to one embodiment of the invention. Embodiments of the invention may operate in wired and/or wireless networks. The exemplary network in FIG. 1 is a wireless network, but embodiments of the invention may also be used in wired networks, as desired.

The exemplary network system of FIG. 1 includes wireless devices 125 and 150 wirelessly coupled to wireless device (e.g., wireless hub or router) 100, according to one embodiment. As shown in exemplary FIG. 1, the wireless device 100 may be a router and the wireless devices 125 and 150 may be a laptop or cell phone (or smart phone or other mobile device). However, it should be noted that other wireless devices are envisioned (for the wireless devices 100, 125, and 150), such as personal digital assistants, multimedia players (portable or stationary), routers, and/or other mobile devices/computing systems which are operable to use wireless communication over a wireless communication medium.

During wireless communication, the wireless devices 100, 125, and/or 150 may perform various communications on the network. For example, the wireless devices may communicate using any of various wireless communication protocols, such as 802.11x protocols (e.g., spread spectrum and/or frequency-division multiplexing protocols), and/or other wireless communication protocols.

According to various embodiments, at least one of the wireless devices 125 and/or 150 comprises logic, which may be hardware, software or a combination thereof, to examine characteristics of the signal being transmitted on the network to perform collision avoidance, as described further below.

Figure 2:
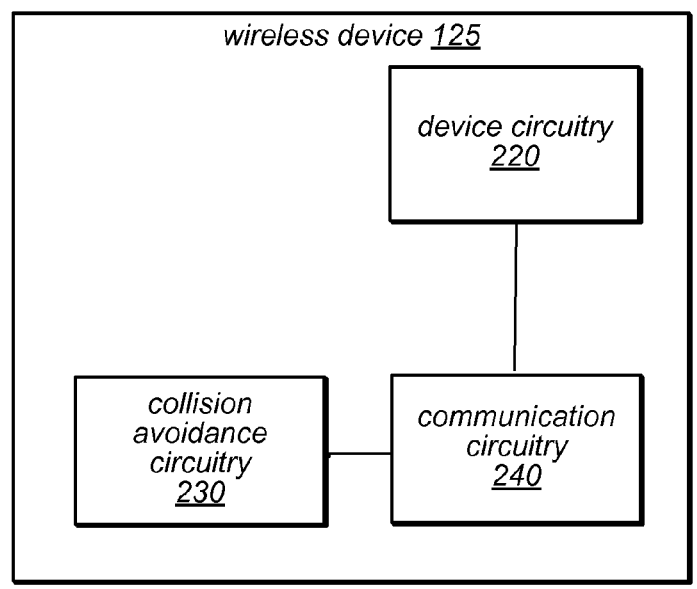
FIGS. 2 and 3 are exemplary block diagrams of a wireless device in the network system of FIG. 1, according to one embodiment.

FIG. 2—Exemplary Block Diagram of the Wireless Device

As shown in FIG. 2, the wireless devices 125 and/or 150 may include various blocks (e.g., circuitry). However, for convenience, only the wireless device 125 is described below, although these descriptions may apply to wireless devices 125 and 150, as well as other devices which may be part of the network.

As shown in FIG. 2, the wireless device 125 may include device circuitry 220 (for performing various functions of the wireless device), communication circuitry 240 (e.g., for WLAN), and collision avoidance block 230. In one embodiment, the communication circuitry 240 and the collision avoidance circuitry 230 may be comprised in a communication device (e.g., a wireless adapter of the wireless device 125). Additionally, the wireless device 125 may include one or more wireless or wired ports for communicating over a network.

The device circuitry 220 in the wireless device 125 may comprise one or more memory mediums and processors for implementing various functionality, as well as various communication circuitry. The communication circuitry 240 may comprise various circuitry (and/or program instructions) for interfacing with a wireless local area network (WLAN). For example, the communication circuitry 240 may include a wireless transceiver operable to perform various communication operations.

The collision avoidance circuitry 230 may comprise program instructions and/or circuitry for performing collision avoidance as described herein. For example, in one embodiment the wireless device 125 may include program instructions stored on a memory medium which may be executable by a processor (which may be either in the device circuitry 220 or the collision avoidance circuitry 230) to perform the collision avoidance functionality or methods described herein. In another embodiment, the collision avoidance circuitry 230 may comprise circuitry for implementing the collision avoidance functionality described herein. In yet another embodiment, the collision avoidance circuitry 230 may comprise a combination of circuitry and/or software for implementing the collision avoidance functionality described herein.

It should be noted that the above described system diagram is exemplary only and that various modifications, additional components, removed components, alternate configurations, etc. are envisioned. Additionally, the block diagram of FIG. 2 may also apply to wireless devices 100 and 150.

Figure 3:
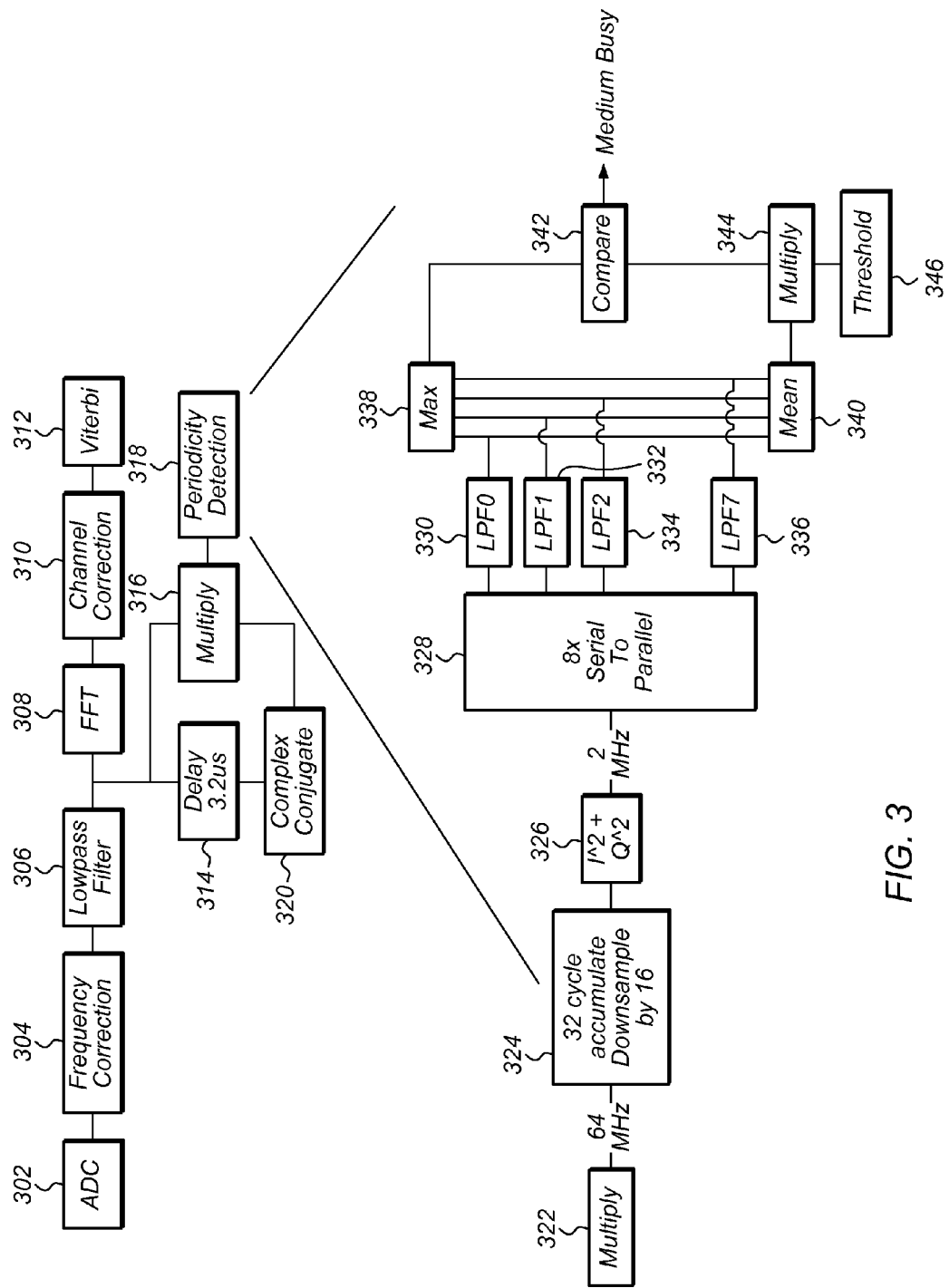

FIG. 3—Wireless Device Block Diagram

FIG. 3 is a block diagram illustrating a mores specific embodiment of the wireless device 125. Note that various elements may be added, removed, or modified, as desired.

The top portion of FIG. 3 (elements 302-320) shows the basic flow of the OFDM receiver. As shown, output from the analog to digital converter (ADC) may be provided to frequency correction block 304, which in turn may provide output to lowpass filter 306. The output from lowpass filter 306 may be provided to fast Fourier transform (FFT) block 308, which may provide its output to channel correction 310. The output from channel correction 310 may be provided to viterbi 312. The output from lowpass filter 306 may also be provided to delay block 314 (e.g., by a value of 3.2 microseconds) as well as multiply block 316. Multiply block 316 may also receive the output from complex conjugate block 320 (which may receive its input from delay block 314). From multiply block 316, the detection of periodicity may be performed by periodicity detection block 318. Thus, the signal received by the ADC 302 may be autocorrelated (as described in more detail below).

An example of an efficient way to do periodicity detection is in the bottom of FIG. 3 (elements 322-346). More specifically, in one embodiment, the signal (the output of the autocorrelator above) may be broken into 0.5 us blocks by using an accumulator to accumulate 32 samples, effectively downsampling the 64 MHz signal by 32 (as shown in multiply block 322 and downsample block 324). The power of this complex value may be measured with $I^2+Q^2$ block 326. Serial to parallel block 328 may then sequentially move the 2 MHz outputs into 8 separate low pass filters (LPFs) (330, 332, 334, . . . , 336). In some embodiments, these filters may be short lowpass filters to further remove noise from the estimates. The output of these filters may represent the repeating energy of the self correlations. Note that in an alternate embodiment, the I^2+Q^2 block 326 could be placed after the LPFs 330. However, such an embodiment may require twice the circuitry, since the LPF stages 330 would need to support both I and Q, but could result in better performance. However, in DSSS embodiments (described below), the I^2+Q^2 block may need to be placed in the configuration shown as an arbitrary phase shift may need to be removed from the PSK symbol before summation.

As described in more detail, if there is a wireless signal, the pattern may correlate well for approximately 0.8 μs, followed by 3.2 μs of poor correlation. Accordingly, if the signal is present, two consecutive windows out of the eight 0.5 μs windows should correlate much better than the others. However, it should be noted that multipath effects can cause intersymbol interference (ISI) that transfer some energy from the preceding symbol into the 0.8 μs guard interval of the current symbol. Thus, such ISI could reduce the normalized correlation value for at least part of the 0.8 μs period. In such embodiments, the threshold in the detection method (described below) should be adjusted or be able to adapt accordingly.

By comparing the maximum value to the average value (times some programmable threshold) using max block 338, mean block 340, multiply block 344, compare block 342, and threshold block 346, it may be determined if the wireless communication medium (for the wireless devices in FIG. 1) is in use by a wireless device. More particularly, it may be determined if there is a wireless signal (e.g., an 802.11 OFDM signal payload) present.

Note that the block diagram illustrated in FIG. 3 could be extended to 1 and 2 Mbps 802.11 signals with an 11-chip, 1Msymbol/second DSSS code. More particularly, 1 microsecond may be substituted for 3.2 microseconds in the delay, and a cross correlation or a self-correlation may be used to determine if the wireless communication medium is in use, each has its advantages. Additionally, the signal may be separated into 8 banks, and only one bank may be expected to have a higher value than the rest, that is, the bank with the perfect correlation timing.

FIGS. 4A-5B—Exemplary Packet Structures

FIGS. 4A-5B illustrate exemplary packet structures, e.g., which may be formatted or transmitted according to the wireless communication protocol, e.g., an 802.11x wireless communication protocol. Thus, the exemplary packet structures of FIGS. 4A-5B may be the packet structure of packets transmitted by the wireless devices in FIG. 1 above, according to various embodiments.

Figure 4A:
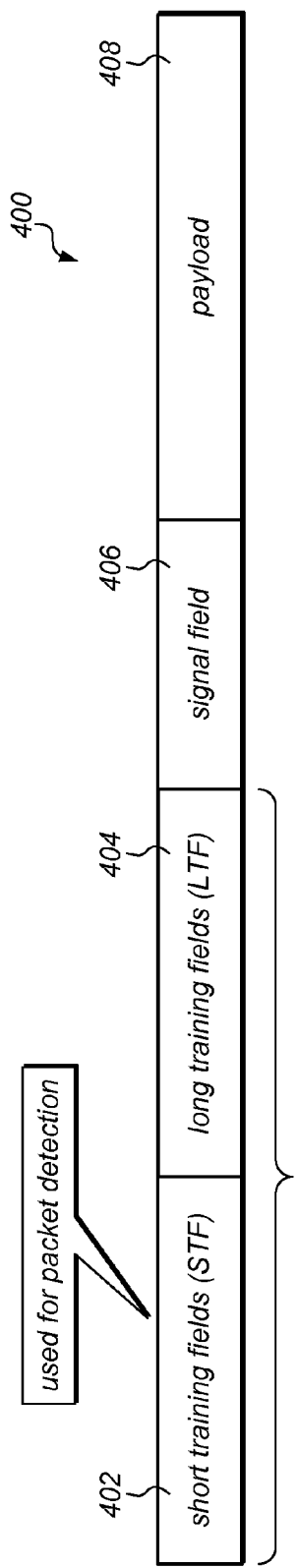
FIGS. 4A-5B are exemplary diagrams of packet structures, according to one embodiment.

As shown in FIG. 4A, packet 400 may include a plurality of segments. The packet may 400 include a preamble 401, a signal field 406, and a payload 408. The preamble 401 may include short training fields (STFs) 402 (e.g., which may be used for packet detection) and long training fields (LTFs) 404.

Figure 4B:
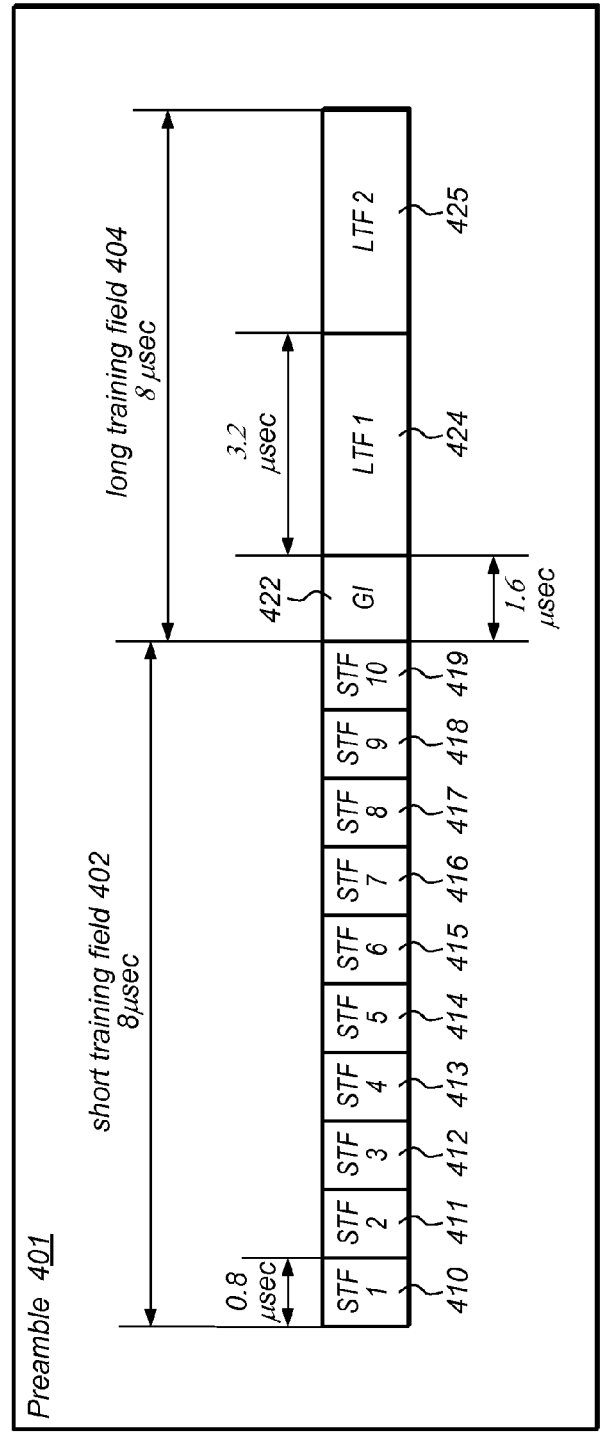

As shown in more detail in FIG. 4B, the preamble 401 may include STFs 402, with a length of 8 microseconds, divided into 10 STFs 410-419 that are 0.8 microseconds, respectively. Similarly, the LTFs 404 may be 8 microseconds total, which may be comprised of GI 422 (1.6 microseconds), LTF 1 (424, 3.2 microseconds), and LTF 2 (425, 3.2 microseconds).

Figure 5A:
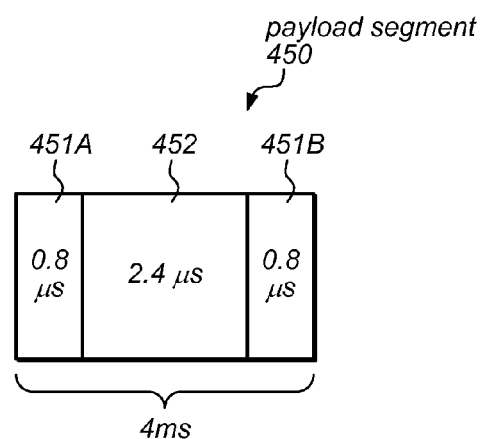
Figure 5B:
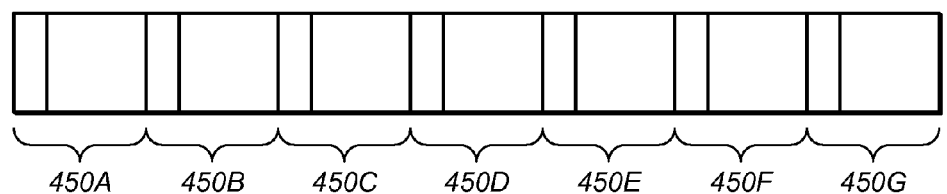

FIG. 5A illustrates a packet element 450 of the payload 408. As shown, the packet element 450 of the payload 408 may include an initial portion 451A and a final portion 451B of length 0.8 microseconds, which may be identical. The middle portion 452 (2.4 microseconds) and the final 0.8 microseconds may include the transmitted data in the packet element 450 of the payload 408. As shown in FIG. 5B, there may be a plurality of packet elements 450A-450G in the payload 408 of packet 400. Thus, the packet 400 may include a plurality of segments.

Figure 6:
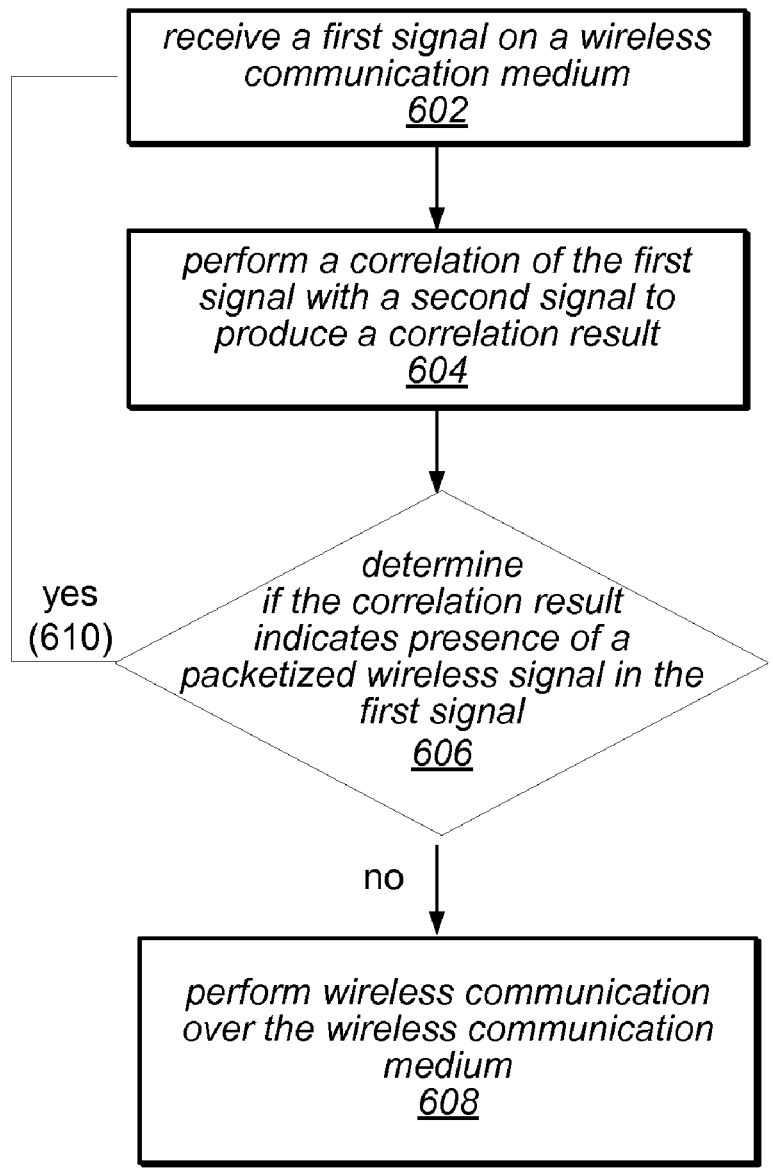
FIG. 6 is a flow chart diagram illustrating embodiments for communicating over a wireless medium.

FIG. 6—Determining if a Wireless Communication Medium is in Use

FIG. 6 illustrates a method for performing wireless communication over a wireless communication medium, and more particularly for determining if the wireless communication medium is in use. The communication may be between a first wireless device and a second wireless device. Note that the method of FIG. 6 may provide an additional (e.g., third) method for determining if the wireless communication medium is in use, which may be used in addition to the methods mandated by the 802.11a/g specification. As described in the specification, one of the methods includes detecting the preamble at the beginning of the frame (e.g., at a threshold below −82 dBm) and decoding the signal field to determine if the communication medium is in use. Another of the methods includes detecting raw in-band power above a threshold (e.g., −62 dBm) to determine if the communication medium is in use. In some embodiments, the method described herein may be applied when the detection of the preamble is missed and if the raw in-band power is below the threshold. This method may be particularly applicable after a collision in a ping-pong collision sequence when the preamble has already been submitted and the receiver can only detect the payload.

As indicated above, the wireless devices may be any of a variety of devices capable of wireless communication, e.g., routers, laptop computers, smart phones or cellular phones, personal digital assistants, etc. The first and second wireless devices may communicate using a wireless communication protocol, e.g., an 802.11x protocol, among other possibilities. The method shown in FIG. 6 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 602, a first signal may be received from the wireless communication medium, e.g., by the first wireless device. The first signal may include a packetized wireless signal from the second wireless device (e.g., which may be attempting to communicate with the first wireless device).

In 604, a correlation of the first signal may be performed with a second signal to produce a correlation result. The second signal may correspond to a wireless communication protocol used in signals on the wireless communication medium.

In one embodiment, the second signal may be a delayed version of the first signal. The delayed version may be delayed by a time period corresponding to a packet structure of the wireless communication protocol used by signals transmitted on the wireless communication medium. For example, the delayed version may be delayed by a time period (e.g., 3.2 microseconds) designed to align respective packet elements present in the first signal and the delayed version of the first signal. More specifically, the delayed version may be delayed by a time period designed to align packet elements (e.g., the packet elements 451A and 451B) between the first signal and the delayed version of the first signal. Thus, the correlation result may be periodic (e.g., every 3.2 microseconds for a time period of 0.8 microseconds) when the first signal includes a packetized wireless signal that is transmitted according to the wireless communication protocol. It should be noted that while 3.2 microsecond and 0.8 microseconds may apply to various wireless protocols (e.g., 802.11g), other values may be used for other wireless protocols. For example, for 802.11j the time period may be 6.4 or 12.8 microseconds (e.g., for half and quarter speed modes). Alternatively, for 802.11, the time period may still be 3.2 microseconds, but the period of high correlation may be reduced to 0.4 microseconds.

Alternatively, for detecting wireless signal transmitted according to a direct sequence spread spectrum (DSSS) wireless protocol, the second signal may include a direct sequence spread spectrum chip pattern. The direct sequence spread spectrum chip pattern may be used to generate packetized wireless signals on the wireless communication medium. In this case, the correlation may be cross correlated with the second signal, e.g., which may be formatted according to the spread spectrum chip pattern. In another embodiment, the correlation may be performed with a delayed version of the same signal (similar to above, although with a different time period, e.g., 1 microsecond). In either case, the correlation result may be periodic (e.g., every 1 microsecond), thereby revealing that the first signal includes a packetized wireless signal that is transmitted according to the wireless communication protocol. Note that similar to descriptions above, the other methods (e.g., in the 802.11x specification) for detecting if the wireless communication medium may be incorporated in embodiments directed to DSSS wireless protocols.

In 606, it may be determined if the correlation result indicates presence of a packetized wireless signal in the first signal. For example, presence of the packetized wireless signal may be indicated by determining if the correlation result is periodic. The presence of a packetized wireless signal may indicate that the wireless communication medium is in use by the second device capable of communicating over the wireless communication medium. The packetized wireless signal may have the packet structure of the wireless communication protocol. More specifically, the packetized wireless signal may be transmitted according to an 802.11x protocol.

In 608, if the correlation result does not indicate presence of the packetized wireless signal in the first signal, wireless communication may be performed over the wireless communication medium, e.g., with the second device. More specifically, the first device may transmit packetized wireless signals to the second device over the wireless communication medium according to the wireless communication protocol.

In 610, if the correlation result indicates presence of the packetized wireless signal, the above receiving the signal (602), performing the correlation (604), and determining if the correlation result indicates the presence of a packetized wireless signal (606) may be performed one or more additional times until it is determined that the wireless communication medium is no longer in use.

ADVANTAGES OF THE METHOD

As indicated above, the above method may be particularly useful in cases where the first device has not detected the preamble of the transmission of the second wireless device and is unable to use typical power or energy detections to determine if the wireless communication medium is in use. Thus, by using the correlation method described above, it may be easily determined if the second wireless device (or another wireless device) is communicating using the wireless communication protocol (as opposed to a microwave oven being currently on). This may be especially useful in avoiding the ping pong collision problem described in the Background section above.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A method for communicating over a wireless communication medium, comprising:
   receiving a first signal from the wireless communication medium;
   performing a correlation of the first signal and a delayed version of the first signal to produce a correlation result, wherein the delayed version is delayed by a time period corresponding to a packet structure of a wireless communication protocol used by signals transmitted on the wireless communication medium;
   determining if the correlation result indicates presence of a packetized wireless signal in the first signal, wherein the packetized wireless signal has the packet structure of the wireless communication protocol, wherein presence of the packetized wireless signal indicates that the wireless communication medium is in use by a device capable of communicating over the wireless communication medium;
   if the correlation result does not indicate presence of the packetized wireless signal in the first signal, performing wireless communication over the wireless communication medium.

2. The method of claim 1,
   if the correlation result indicates presence of the packetized wireless signal, repeating said receiving, said performing, and said determining one or more additional times.

3. The method of claim 1,
   wherein the delayed version is delayed by a time period designed to align respective packet elements present in the first signal and the delayed version of the first signal.

4. The method of claim 1,
   wherein the delayed version is delayed by a time period designed to align a cyclic prefix packet segment of the first signal and an ending segment of the delayed version of the first signal.

5. The method of claim 1,
   wherein said determining if the correlation result indicates presence of the packetized wireless signal comprises determining if the correlation result is periodic.

6. The method of claim 1, wherein the packetized wireless signal is transmitted according to an 802.11 protocol.

7. The method of claim 1, wherein the time period comprises 3.2 microseconds.

8. A non-transitory memory medium comprising program instructions for determining when to communicate over a wireless communication medium, wherein the program instructions are executable to:
   perform a correlation of a first signal received from the wireless communication medium and a delayed version of the first signal to produce a correlation result, wherein the delayed version is delayed by a time period corresponding to a packet structure of a wireless communication protocol;
   determine if the correlation result indicates that the first signal has the packet structure of the wireless communication protocol, wherein the first signal having the packet structure of the wireless communication protocol indicates that the wireless communication medium is in use by a device;

if the correlation result does not have the packet structure of the wireless communication protocol, initiate wireless communication over the wireless communication medium.

9. The non-transitory memory medium of claim 8, wherein the program instructions are further executable to:
if the correlation result indicates presence of the packetized wireless signal, repeat said performing and said determining one or more additional times.

10. The non-transitory memory medium of claim 8,
wherein the delayed version is delayed by a time period designed to align respective packet elements present in the first signal and the delayed version of the first signal.

11. The non-transitory memory medium of claim 8,
wherein the delayed version is delayed by a time period designed to align a cyclic prefix packet segment of the first signal and an ending segment of the delayed version of the first signal.

12. A communication device, comprising:
an antenna for receiving a first signal from a wireless communication medium;
first circuitry for performing a correlation of the first signal and a delayed version of the first signal to produce a correlation result, wherein the delayed version is delayed by a time period corresponding to a packet structure of a wireless communication protocol used by signals transmitted on the wireless communication medium;
second circuitry for determining if the correlation result indicates presence of a packetized wireless signal in the first signal, wherein the packetized wireless signal has the packet structure of the wireless communication protocol, wherein the first signal having the packet structure of the wireless communication protocol indicates that the wireless communication medium is in use by a device;
wherein the communication device is configured to perform wireless communication over the wireless communication medium if the correlation result does not indicate presence of the packetized wireless signal in the first signal.

13. The communication device of claim 12, wherein the communication device is further configured to:
repeat said performing and said determining one or more additional times if the correlation result indicates presence of the packetized wireless signal.

14. The communication device of claim 12,
wherein the delayed version is delayed by a time period designed to align respective packet elements present in the first signal and the delayed version of the first signal.

15. The communication device of claim 12,
wherein the delayed version is delayed by a time period designed to align a cyclic prefix packet segment of the first signal and an ending segment of the delayed version of the first signal.

16. A method for communicating over a wireless communication medium, comprising:
receiving a first signal from the wireless communication medium;
performing a correlation of the first signal with a second signal to produce a correlation result, wherein the second signal corresponds to a wireless communication protocol used in signals on the wireless communication medium;
determining if the correlation result indicates presence of a packetized wireless signal in the first signal, wherein presence of the packetized wireless signal indicates that the wireless communication medium is in use by a device capable of communicating over the wireless communication medium;
if the correlation result does not indicate presence of the packetized wireless signal, performing wireless communication over the wireless communication medium.

17. The method of claim 16,
wherein the second signal comprises a delayed version of the first signal, wherein the delayed version is delayed by a time period corresponding to a packet structure of a wireless communication protocol used by signals transmitted on the wireless communication medium.

18. The method of claim 16,
wherein the second signal comprises a direct sequence spread spectrum chip pattern, wherein the direct sequence spread spectrum chip pattern is used to generate packetized wireless signals on the wireless communication medium.

19. A method for communicating over a wireless communication medium, comprising:
receiving a first signal from the wireless communication medium;
performing a correlation of the first signal and a direct sequence spread spectrum chip pattern to produce a correlation result, wherein the direct sequence spread spectrum chip pattern is used to generate packetized wireless signals on the wireless communication medium;
determining if the correlation result indicates presence of the packetized wireless signals, wherein presence of the packetized wireless signal indicates that the wireless communication medium is in use by a device capable of communicating over the wireless communication medium;
if the correlation result does not indicate presence of the packetized wireless signal, performing wireless communication over the wireless communication medium.

* * * * *